June 14, 1949.  J. E. WHITFIELD  2,473,233
ROTOR GENERATING
Filed Jan. 12, 1943  5 Sheets-Sheet 1
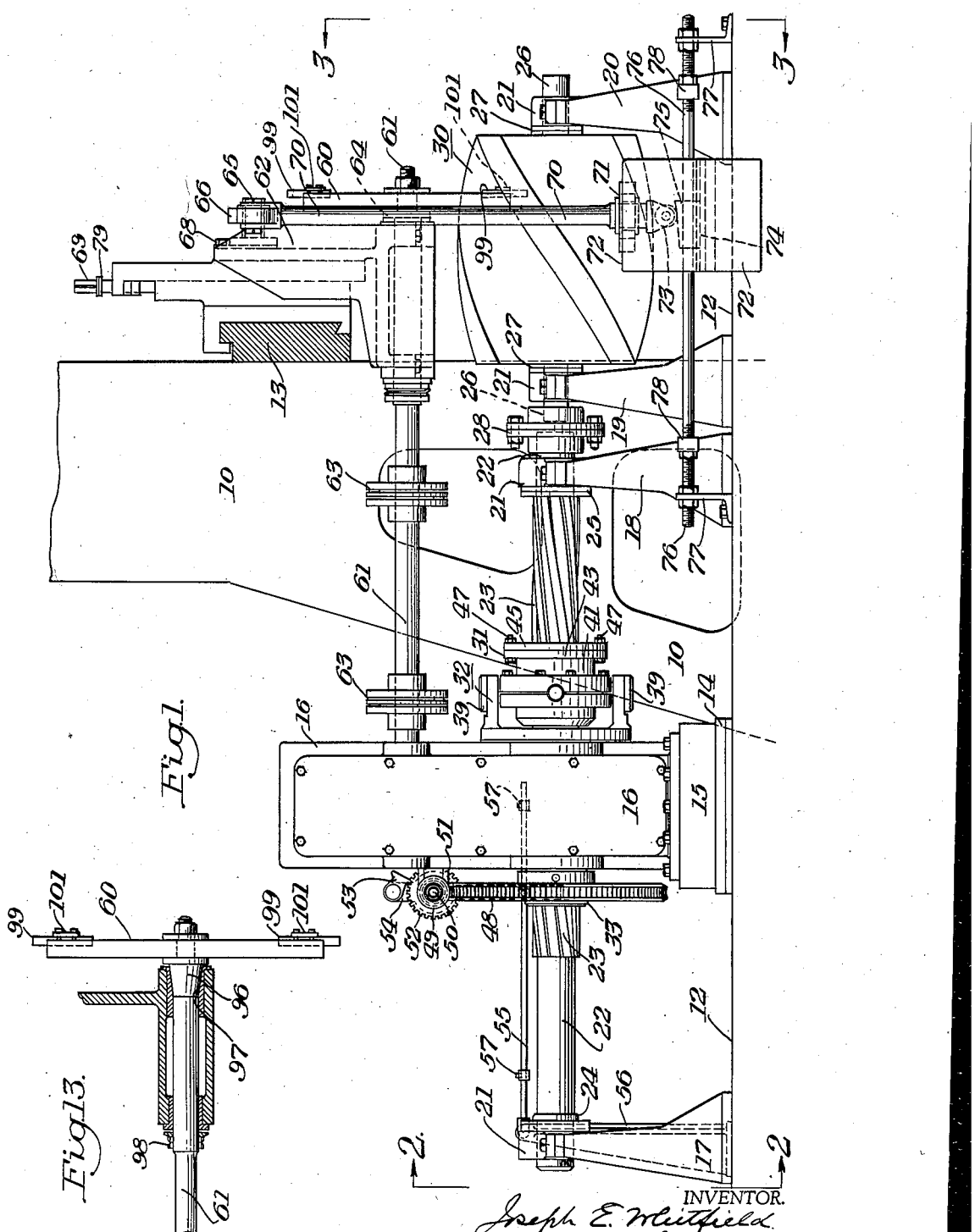
INVENTOR.
Joseph E. Whitfield
BY Edward A. Lawrence
his attorney

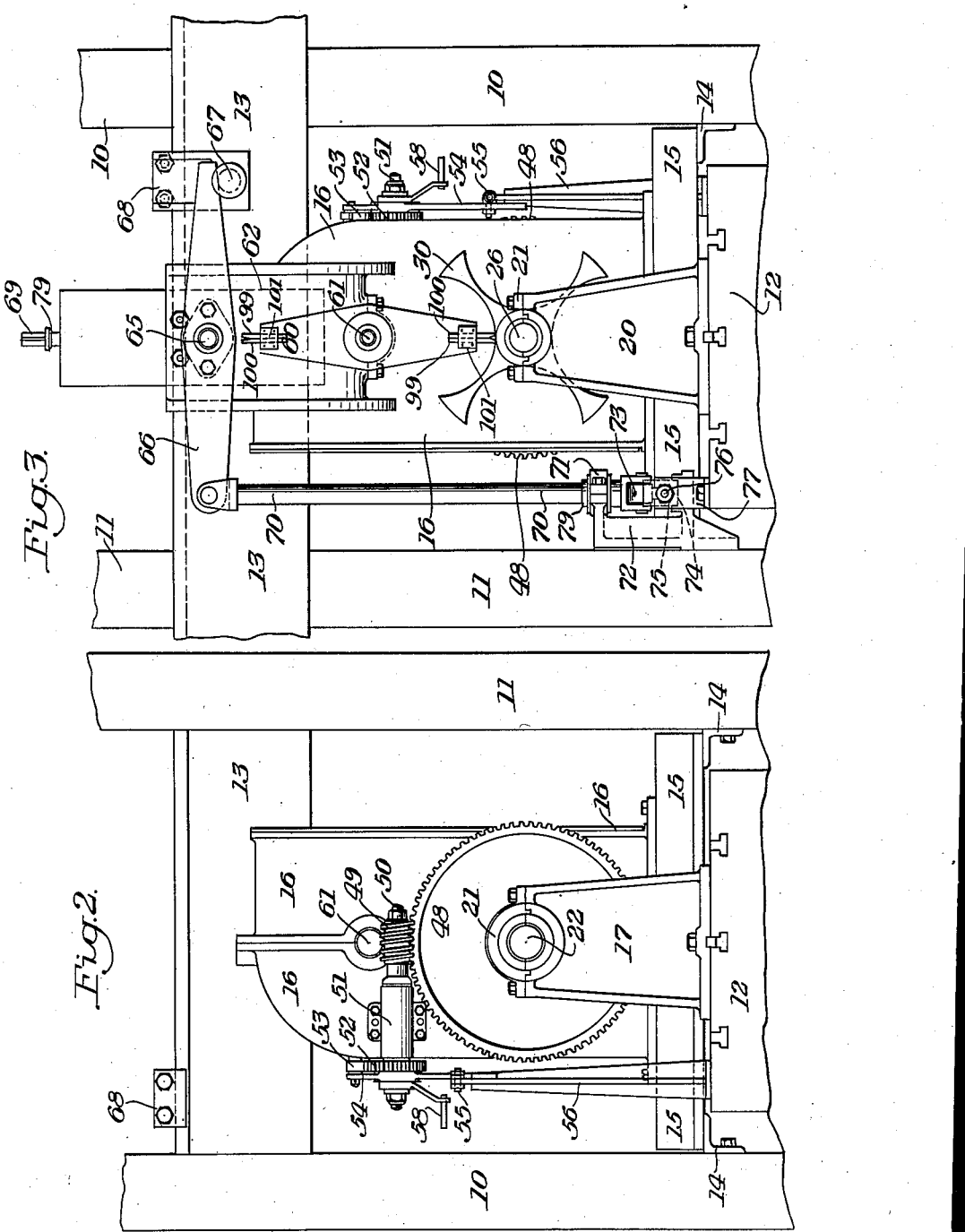

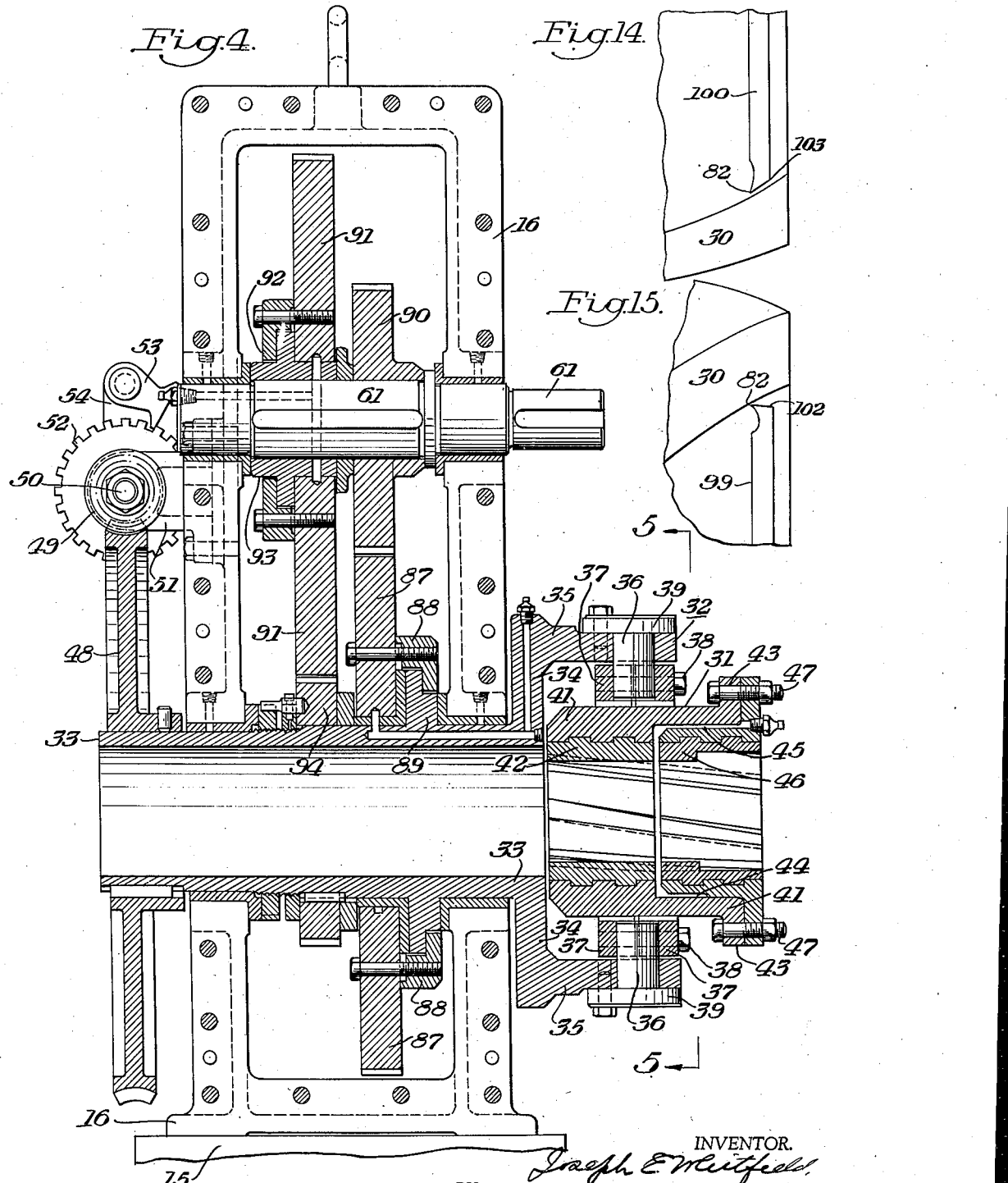

June 14, 1949.   J. E. WHITFIELD   2,473,233
ROTOR GENERATING
Filed Jan. 12, 1943   5 Sheets-Sheet 4
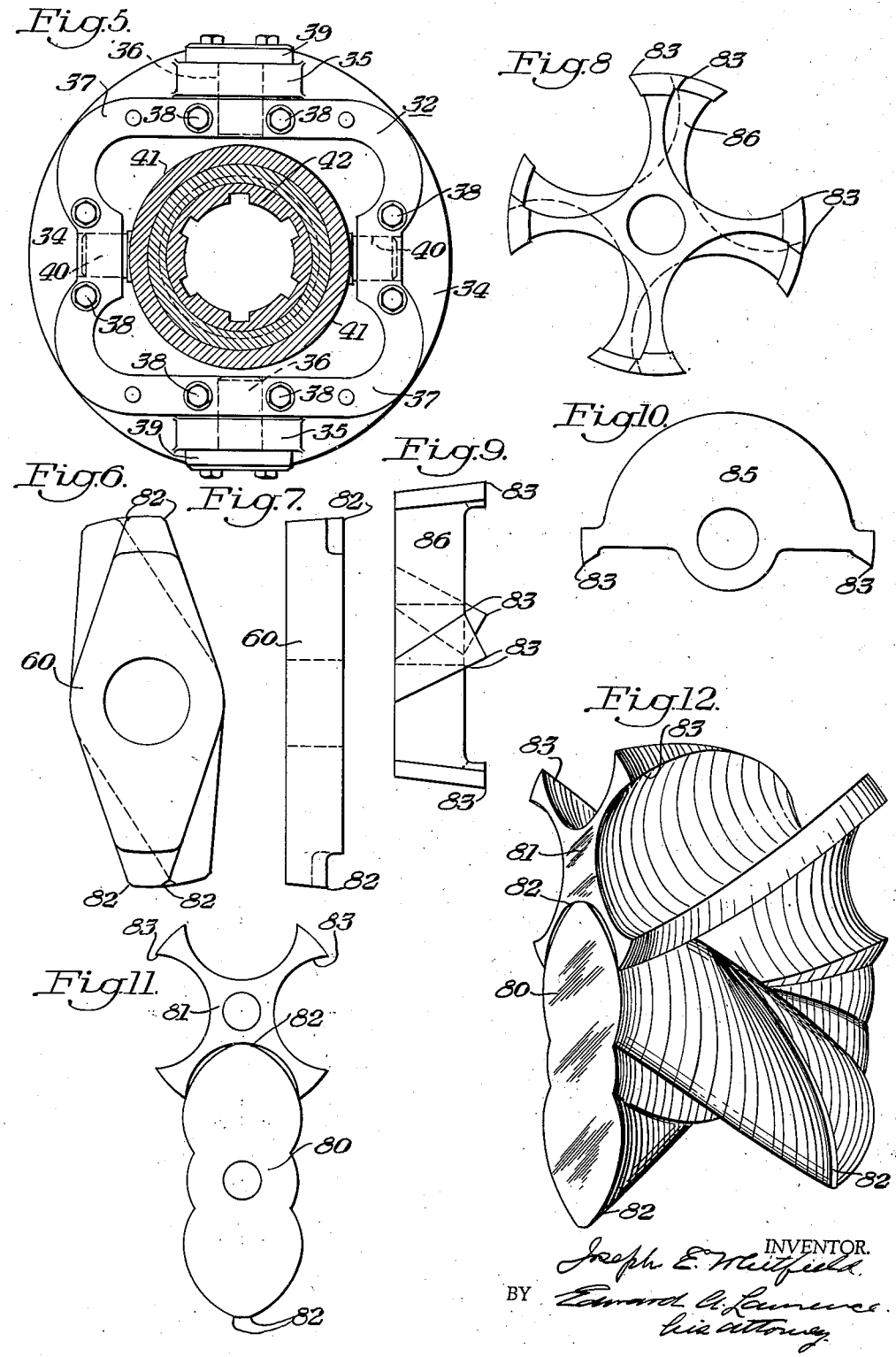

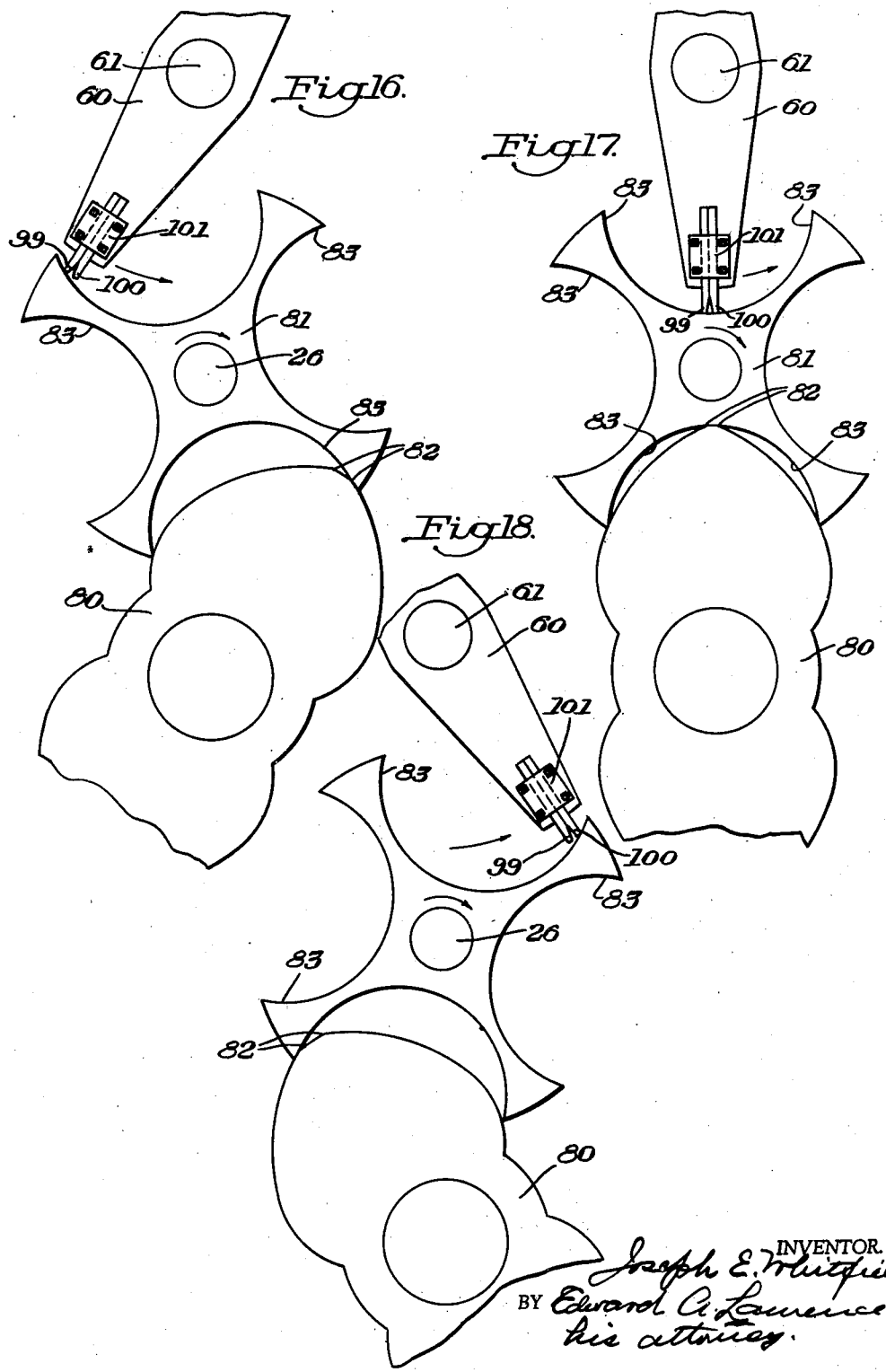

Patented June 14, 1949

2,473,233

UNITED STATES PATENT OFFICE 2,473,233

ROTOR GENERATING

Joseph E. Whitfield, Hamilton, Ohio

Application January 12, 1943, Serial No. 472,132

6 Claims. (Cl. 90—8)

1

This invention relates generally to gear cutting and more particularly to the method and apparatus for forming the working faces of the helical gear forms of the male and female rotors of a screw blower by generation with a cutter that has relative reciprocating movement with the blank and which intermeshes with the blank after the manner of a mating gear and rotates in timed relation therewith during the generating operation.

The screw blower male and female rotor members to be formed have complementary intermeshing helical teeth, the curved sides of the helical teeth of the male rotor being described by the continuous crest edges of the helical teeth of the female rotor and the curved troughs of the female rotor teeth being described by the continuous crest edges of the helical teeth of the male rotor. The full depth of the teeth of the male rotor are preferably full or all addendum, the pitch circle being less than the root diameter. The complementary teeth and troughs of the female rotor are preferably full or all dedendum, the pitch circle being greater than the outside diameter of the rotor. Again there is no clearance except the normal running clearance between the crests and troughs of these rotor teeth. These rotors are shown and described in Letters Patent No. 2,287,716.

The principal object of this invention is the provision of a method and apparatus for cutting teeth on matched rotors which are fully complementary in that the teeth of one are totally addendum and the teeth of the others are totally dedendum.

Another object is the provision of a method and apparatus for cutting complementary teeth on rotors in which the pitch line is wholly within the finished hub of one of the rotors.

Another object is the provision of a method and apparatus for cutting full complementary teeth on one of a matched pair of rotors by the point of a tool which represents the crest edge of the complemental tooth on the other rotor.

Another object is the provision of a method and apparatus for cutting teeth on rotors by the crest edge of a tool the cross sectional shape of which are complementary to the teeth.

Another object is the provision of a method and apparatus for cutting helical teeth on rotors by the use of a pointed tool having relative rotary and longitudinal movement with respect to and in timed relation with the rotor. The limit of the relative rotary and longitudinal movements for one stroke of the tool is that of the helix angle

2 and the length of the tooth and the feed is obtained by rotating the tool and the rotor in timed relation in steps after successive longitudinal relative movement.

Another object of this invention is the cutting of complementary teeth on rotors by generation without form cutters. Cutter wear does not affect the tooth profile but merely make it oversize which may be readily compensated for by adjustment.

Another object is the provision of apparatus for providing relative rotary movement between a cutting tool and a gear blank.

Another object is the provision of apparatus for providing relative longitudinal movement between a cutting tool and a gear blank.

Another object is the provision of apparatus for planing the surfaces of rotor teeth in which the curved surface is produced by a tool having a stroke of relative longitudinal movement in a curved path with respect to the rotor with a feeding movement at the end of each stroke produced by rotating the tool and the rotor in timed relation.

Other objects and advantages appear in the following description and claims.

In the accompanying drawings a practical embodiment illustrating the principles of this invention is shown wherein:

Fig. 1 is a side view in elevation of a planer and gear cutting planer attachment with parts broken away.

Fig. 2 is an end view in elevation taken on the line 2—2 of Fig. 1.

Fig. 3 is an end view in elevation taken on the line 3—3 of Fig. 1.

Fig. 4 is a sectional view of the planer attachment.

Fig. 5 is an end view of the spline guide assembly.

Fig. 6 is a front view in elevation of the female rotor tooth cutting tool.

Fig. 7 is a side view of the tool shown in Fig. 6.

Fig. 8 is a front view in elevation of the male rotor tooth cutting tool.

Fig. 9 is a side view of the tool shown in Fig. 8.

Fig. 10 is a front view in elevation of a modified form of the male rotor tooth cutting tool.

Fig. 11 is an end view of the male and female rotors in mesh.

Fig. 12 is a perspective view of the male and female rotors in mesh.

Fig. 13 is a detailed sectional view of a modified form of the tool shaft.

Fig. 14 is a partial view of the gate rotor member illustrating a cutting tool for generating the left side of the trough.

Fig. 15 is a partial view of the gate rotor member illustrating a cutting tool for generating the right side of the trough.

Fig. 16 is a diagrammatic view illustrating the relative positions of the cutting tool and the gate member at the beginning of the generating stroke, the rotor member being shown to illustrate the relative positions of the tool and the rotor member with respect to the gate as the latter is being generated.

Fig. 17 is a view similar to Fig. 16 showing the tool in the center of the generating stroke.

Fig. 18 is a view similar to Fig. 16 showing the tool nearing the end of the generating stroke.

Referring principally to Figs. 1, 2 and 3 of the drawing, 10 and 11 represent the columns of a planer which are rigidly connected to the machine bed, the upper surface of which is provided with ways for slidably supporting the planer table 12. A cross rail 13 is mounted to move vertically on ways formed on the front faces of the columns 10 and 11. A pair of inwardly extending and oppositely disposed angle brackets 14 are fastened to the inner faces of the column of the machine and are positioned to just clear the table 12. A bridge member 15 is secured at its ends to the brackets 14 and spans the table 12 permitting the latter to traverse freely thereunder.

A housing 16 is carried by the bridge member 15 and is arranged to support and enclose the timing gear and feed mechanism of the planer attachment. The planer table 12 has four standards 17, 18, 19 and 20 mounted in spaced relation, each carrying an axially aligned cap bearing 21. The cap bearing of the standards 17 and 18 are arranged to rotatably support the shaft 22, the intermediate portion of which is provided with a helical splined section 23 which passes through the housing 16. If the teeth of the rotor members are straight throughout their length the splined section should be straight. On the other hand if the teeth have a helical twist then the helix angle of the splined section 23 should be the same. The ends of the spline shaft 22 are provided with a thrust collar 24 and thrust rings 25 which abut against the end faces of the bearings 21 to prevent longitudinal movement of the shaft 22 and to transmit the axial thrust to the standards 17 and 18 respectively.

The cap bearings of the standards 19 and 20 are arranged to rotatably support the shaft 26 which is also provided with thrust rings 27 that abut against the end faces of the bearings 21 to prevent longitudinal movement of the shaft 26 and to transmit the axial thrust of said shaft to the standards 19 and 20. Thus the axial thrust of each of the shafts 22 and 26 is independently transmitted to the table 12 and have no effect upon one another. The shafts 22 and 26 are connected at their adjacent ends by the coupling 28 which rotatably drives the latter from the former and permits quick connection and disconnection of the shaft 26 from the assembly.

The rotor blanks 30, on which the helical gear teeth are cut, are mounted on the shafts 26. The blank shown in the drawings is that of a female rotor. These blanks may be cast oversize to the approximate shape of the rotor member and then placed on the machine for cutting. The shaft 26 may be removably mounted in the rotor blank 30 but it is preferable to cast the blank directly on the shaft 26, thus providing a permanent rotor and shaft structure.

The spline 23 on the shaft 22 mates with the splined nut 31 which is cradled in the universal joint assembly 32 carried on the end of the hollow shaft 33 that extends through and is journaled in the housing 16, as shown in Fig. 4. One end of the hollow shaft 33 is provided with a radially extending flange 34 having a pair of axially extending lugs 35 forming a yoke. Aligned holes are drilled transversely through the lugs 35 for rotatably receiving the stub shafts 36 which are clamped in sockets formed in the adjacent faces of the rings 37 by the bolts 38. Cap plates 39 are bolted to the outer surface of the lugs 35 for enclosing the stub shafts 36.

The rings 37 are provided with another set of aligned sockets disposed at ninety degrees from the lugs 35 in which the inwardly projecting stub shafts 40 are clamped by the bolts 38. The other end of the stub shafts 40 are rotatably received in aligned bearings on opposite sides of the casing 41. The casing 41 has an inner lining 42 the bore of which has a spline formed complementary to the spline 23 on the shaft 22. The outer end of the casing 41 is provided with a radially extending flange 43 and an enlarged bore 44 for receiving the flanged collar 45 which also has a matched splined inner lining 46. The flange of the collar 45 is secured to the flange 43 by the bolts 47. The bolt holes in the flange 43 are elongated to permit relative rotary adjustment of the collar 45 with respect to the casing 41. When the splined liner sections 42 and 46 are worn from use the collar 45 may be adjusted arcuately so that the splines in the liner 42 engage one side of the spline on the shaft 22 while the splines in the liner 46 of the collar engage the other side. With this arrangement the wear may be taken up eliminating any lost motion or back lash, thus assuring accuracy in gear or rotor cutting.

Again the universal support for the splined nut 31 provides a flexible connection with continuous alignment in transmitting rotary power to or from the shaft 22 when the latter is reciprocated by the table 12 even through there may be slight variations relative to the hollow shaft 33.

The hollow shaft 33 extends beyond the other side of the housing 16 as shown in Fig. 4 to receive the worm wheel feed gear 48 which is driven by the worm 49 secured to one end of the shaft 50 that is journaled in the bearing 51 fastened to the side of the casing 16. On the other side of the bearing 51 the shaft 50 has a square toothed ratchet feed gear 52 secured thereto which is arranged to be stepped by the pawl or ratchet 53 pivotally supported on the upper short arm of the lever 54. The lever 54 is pivoted on the shaft 50 and is provided with a lower long arm having an adjustable block with an opening for slidably receiving the feed rod 55 which is pivotally supported at one end on the standard 56 secured to the table 12. Stops 57 are adjustably fastened to the rod 55 for engaging the long arm of the lever 54 at the end of a cutting stroke to rock the ratchet 53 and thus step the ratchet gear 52 and rotate the shaft 50, and thereby rotate the shaft 33 through the worm drive, which motion is transmitted to the shaft 22 by the splined nut 31.

The ratchet 53 may be thrown in either direction for effecting a rotary feed in either direction of the shaft 22. A hand crank 58 is secured to the end of the shaft 50 for initially positioning the work piece and the tool or for operating the feed manually.

The cutting tool 60 is secured to one end of the shaft 61 which is journaled in the tool head 62 slidably mounted to move vertically on the planer cross rail tool slide. The shaft 61 extends back between the columns 10 and 11 to the housing 16 where it is journaled in spaced bearing. The axis of the shaft 61 is in the same vertical plane as the shafts 22, 26 and 33 and is provided with two flexible couplings 63 between the tool head 62 and the housing 16 which permit limited vertical and horizontal movement but are rigid torsionally. A suitable thrust bearing 64 is provided on the shaft 61 at the face of the tool head 62 adjacent the tool 60 for assuming the thrust forces when the tool is cutting.

The upper end of the tool head 62 is provided with a stub shaft 65 as shown in Figs. 1 and 3 on which the intermediate portion of the lever 66 is pivotally supported. One end of the lever 66 rests on the roller 67 rotatably mounted on the block 68 clamped to the face of the planer cross rail 13. An operating rod 70 is pivotally connected to the other end of the lever 66. The rod 70 passes down through a bearing 71 mounted in the bracket 72 fastened to the inner face of the column 11. The lower end of the rod carries a roller 73 the axis of which is horizontally disposed. Below the bearing 71 the bracket 72 is provided with a track 74 which slidably carries the wedge block 75. The wedge block has a central aperture for slidably receiving the trip rod 76 which is supported at its ends by the brackets 77 secured to the table 12. Trip slides 78 may be adjustably secured to any suitable position on the trip rod 76 for engaging the wedge block 75 at each end of the table stroke to move the wedging surface into or out of engagement with the roller 73.

When the table 12 moves the work piece to the left in Fig. 1 during a cutting stroke the right trip 78 strikes the wedge block, moving it along the track 74 into engagement with the roller 73 at the end of the cutting stroke to raise the tool out of cutting position. The vertically slidable tool head 62 carries the feed screw 69 which reciprocates through an opening in the crosshead tool slide. A collar 79 on the vertical feed screw 69 strikes the top of the crosshead tool slide and limits the downward movement of the latter and thereby fixes the lowermost position of the tool 60. To regulate the depth of the cut or if the tool wears and must be lowered further to produce a finished cut, the slidable tool head 62 may be adjusted vertically by means of the vertical threaded feed screw at the top of the cross rail slide or by adjustment of the cross rail.

The tool 60 cuts the work piece during the movement of the table 12 to the left in Fig. 1 and after the stroke has been completed the right trip 78 engages the wedge block 75 shoving it along the track and into engagement with the roller 73, causing it to ride up the inclined wedging surface and raise the tool head 62 lifting the tool out of its working position. The table 12 is then reversed and moves to the right. The trip then moves away from the wedge block which stays under the roller retaining the tool in its elevated position permitting the complete traverse of the table 12 with the tool lifted out of cutting position. When the tool clears the work piece on its movement to the right the left trip 78 again engages the wedge block 75, moving it out from under the roller 73, thereby permitting the tool to drop to its cutting position for the next working stroke of the planer. The table is then reversed and the cutting stroke is repeated. This vertical movement of the tool head is permitted by the flexible couplings 63 in the shaft 61.

Referring again to Fig. 4 the hollow shaft 33 and the shaft 61 are journaled in the stationary housing 16 with their axes in the same vertical plane and are connected by two sets of timing gears which correlate the rotary movement of the tool 60 and the rotor blank 30. As shown in Figs. 11 and 12 the teeth of the rotor gear members have a ratio of two to four. The male rotor 80, sometimes referred to as the "rotor," has two teeth or threads and the female rotor 81 or "gate" has four teeth or threads. The crest edges 82 of the male rotor teeth generate the corresponding sides of the female rotor troughs and the crest edges 83 of the female rotor teeth generate the corresponding sides of the male rotor teeth. Thus the planing tools for cutting these teeth need only be pointed tools set equivalent to the crest edges of the respective rotor members. Thus the male cutting tool 60 shown in Figs. 6 and 7 has the cutting points 82 and the female cutting tool 85 shown in Figs. 8, 9 and 10 has the cutting points 83 which represent the opposite crest edges of a female rotor thread for cutting the male rotor.

Again the male or female cutting tool may take the exact shape of the rotor member as shown by the female cutting tool 86 in Figs. 8 and 9 which has eight cutting points 83. This type of cutting tool is preferably used for producing the finishing cut on the rotor members.

Since the teeth of the rotor members have a one to two ratio the timing gears in the housing 16 as shown in Fig. 4 must also have the same ratio. Thus when cutting a female block 30 by the cutter 60, as shown in Fig. 1, the large timing gear 87 on the hollow shaft 33 in the housing 16 must be clamped by the clutch ring 88 to the hub 89 that is integral with the shaft. The large gear 87 meshes with the small gear 90 which is fixed to the shaft 61 and the work piece is advanced half as much as the tool for feeding and for producing the cut along the helix chosen. When cutting the male rotor the converse is true, the work piece or male rotor blank must be advanced twice as much as the tool. Thus the large gear 91 on the shaft 61 must be clamped by the clutch ring 92 to the hub 93, which is keyed to the shaft 61. The large gear 91 meshes with the small gear 94 keyed to the hollow shaft 33. Obviously when one set of timing gears are employed to maintain the shafts 33 and 61 in timed relation during the operation of the machine the other set is permitted to idle by loosening the corresponding clutch ring. However the clutch ring not being employed to drive is permitted to drag, thereby creating sufficient friction to eliminate lost motion or back lash of the gears to prevent chattering between the work and the cutter due to any lack of rigidity in mechanism.

In operating the gear cutting mechanism the dimensions and the pitch circles of the rotor members are first determined and the helix angle is selected. The splined section 23 of the shaft 22 is then chosen to agree with the helix angle of the gear teeth to be cut. In some instances the helix angle may be different adjacent the ends of the rotor members than it is in the intermediate section, or the teeth may have no helix angle, in which cases the splined section 23 must correspond. The work piece blank 30 which is mounted on the shaft 26 is then placed in position on the standards 19 and 20 and the coupling 28 is connected. The trip slides 78 which control the raising and lowering of the tool are set relative to the length of the table stroke to permit their functioning before the ends of the stroke. The feed stops 57 are adjusted to produce the proper rotation of the tool and the work at the end of each cutting stroke to provide the feed desired for the next stroke of the planer table. The lowermost position of the tool to determine the depth of the cut is adjusted by the screw on the cross rail head and the proper timing gear clutch ring is clamped in operating position for coordinating the rotation of the tool relative to the work piece.

The machine is then placed in motion and the automatic trips which control the table traversing movements continue to automatically operate the gear cutting attachment.

With the shafts 33 and 61 locked together by the timing gears the tool is held stationary during the intermediate portion of the traverse of the planer table by the intermeshing of the feed worm and gear. The splined nut 31 is unable to turn and the reciprocal movement of the shaft 22 in passing through the stationary splined nut causes the work piece to be rotated in accordance with the helix of the splined shaft section 23. By operating the feed through the worm and gear the tool and the rotor blank are rotated in steps which generate the teeth on the blank. The gear teeth thus formed are accurate and true and are not dependent upon the shape or condition of the tool. Thus the feed generates the tooth profile and the spline generates the helix or length of the tooth.

Referring now to Fig. 13 it will be noted that the forward or tool end of the shaft 61, which is journaled in the tool head 62, is provided with an outwardly flaring frusto conical surface 96 which mates with the complementary frusto conical surface in the fore part of the bearing. The angle of taper of these mating conical bearing surfaces is selected to permit the cutting forces on the tool to force these surfaces into tight engagement and lock the shaft against movement to avoid tool chattering but the conical angle must be sufficiently large that the cutting force will not cause the mating frusto conical surfaces to freeze making it difficult for the shaft to be released at the end of the cutting stroke. The cutting point of the tool 60 being spaced from the shaft 61 aids in multiplying the reactive forces which jump the tool forward as it leaves the cutting surface. If the conical angle is properly chosen in accordance with a given cutting force the reactive forward kick of the cutting tool at the end of the cutting stroke aids in freezing the mating frusto conical surfaces. A sufficient clearance is allowed between the locking rings 98 and the tool head 62 to permit the shaft 61 to move forward sufficiently causing disengagement between the mating frusto conical surfaces. When there is no pressure on the cutting tool 60 the mating frusto conical surfaces permit the shaft 61 to freely revolve, but when the tool strikes the work the shaft 61 is automatically locked. This tool shaft locking structure is an important object of this invention and its advantages enhance the operation of the generating machine.

In some rotor gear forms the cutting points 82 on the male cutting tool 60, for cutting the female gate rotor member, may be formed integral with the tool as described hereinbefore with reference to Figs. 6 and 7. However the deep arcuately shaped trough with the helical twist requires differently shaped cutting tools for forming the opposite sides of the troughs. The cutting points 82 and the adjacent parts of the tool may be shaped to conform with these requirements but it is considerably more economical to provide detachable cutting points or bits as illustrated at 99 and 100 in Figs. 1, 3 and 13 which are clamped to the ends of the cutting tool 60 by the plates 101. Referring specifically to Fig. 3, the bit 99 is arranged to cut the adjacent side of the gate trough and the bit 100 cuts its adjacent side of the same trough, and both bits cut the bottom of the trough. During the transfer of the cutting tool 60 from one side of the gate trough to the other the bite of the cutting bit 99 gradually diminishes while the bit 100 starts to cut. The bite of the bit 100 thus increases concurrently while the bite of the bit 99 decreases until all of the cutting load is transferred from one bit to the other as the cutting tool 60 is moved in successive steps from one side of the gate trough, across the bottom to the other by the operation of the automatic feed through the ratchet feed gear 52. Three positions of the cutting tool 60 and the gate rotor are illustrated in Figs. 16, 17 and 18. In Fig. 16 the bit 99 is cutting the left side of the trough and the bit 100 is clear of the work. Fig. 17 shows the center of the transition period where both bits 99 and 100 are cutting with the same bite. However during the next step of the feed in moving the tool to the right side of the gate rotor trough increases the bite of the bit 100 and concurrently decreases the bite of the bit 99. Fig. 18 shows the bit 100 cutting the right side of the trough and the bit 99 is clear of the work.

The profile of the bits 99 and 100 are rounded as shown in Figs. 16, 17 and 18, and the cutting points 82 on these bits are set in the tool 60 so that they are the same distance apart as the edges of the rotor thread when measured at right angles to the axis of the rotor. Thus the cutting points 82 when mounted on the tool 60 correspond to the crest edges of the rotor member and thereby generate the trough of the gate when the work is reciprocated.

The rotor and gate members are ordinarily cast over size and the generating machine finishes them to size.

The heel 102 of the bit 99 as shown in Fig. 15 is substantially at right angles to the face of the bit, being backed off only slightly, whereas the rake of the heel 103 of the bit 100 is considerable. By backing off the heels of the bits in this manner there is no tendency for them to ride the work and prevent the tip from cutting. The tool 100 does not provide the proper cutting action for the other side of the trough as it drags over the metal and the converse is true of the other tool bit 99. It is also necessary to provide a side rake on these bits because of the helix angle of the rotors. It is also necessary to properly form the cutting point as shown to provide clearance for the chips.

By using separate bits each may be properly ground to suit the particular work piece to be finished.

I claim:

1. In a gear box for use with a machine for generating complementary rotors, the combination of a housing, parallel shafts journaled in the housing, one of said shafts being hollow and arranged to carry a splined nut, a splined shaft mounted in the nut and arranged to rotate a rotor blank, the other of said first mentioned shafts arranged to rotate a tool, means for rotating one of said shafts, and a pair of intermeshed timing gears connecting said shafts for maintaining them in correlated timed relation.

2. The structure of claim 1 in which the means for rotating one of said shafts prevents said shafts from turning other than by said means.

3. In a machine tool the combination of a tool supporting head, a shaft journaled in said head, a tool carried on one end of the shaft, a cutting bit carried by the tool, a support for carrying a work piece, means for producing relative reciprocating movement between the tool and the support for machining a work piece, a frusto conical section on the tool end of said shaft, a mating frusto conical surface in the tool head for receiving the frusto conical section of the shaft to lock the tool by the cutting forces when the cutting bit engages the work piece during a cutting stroke.

4. The structure of claim 3 wherein the angle of the mating frusto conical surfaces is selected to provide disengagement between the mating frusto conical surfaces upon sudden release of the cutting pressure when the bit leaves the work piece at the end of the cutting stroke.

5. The structure of claim 3 which also includes means for rotating the shaft and tool when the frusto conical surfaces are not locked in engagement by the cutting forces between the bit and the work piece.

6. The structure of claim 3 which also includes a collar for limiting the relative longitudinal movement of the mating conical surfaces away from one another.

JOSEPH E. WHITFIELD.

REFERENCES CITED

The following references are of record in the file of this patent:

UNITED STATES PATENTS

| Number | Name | Date |
|---|---|---|
| 259,043 | Reynolds | June 6, 1882 |
| 497,997 | Wilkin | May 23, 1893 |
| 579,708 | Fellows | Mar. 30, 1897 |
| 1,103,851 | Sykes | July 14, 1914 |
| 1,388,853 | Davis | Aug. 30, 1921 |
| 1,415,341 | Hanson | May 9, 1922 |
| 1,423,266 | Sears | July 18, 1922 |
| 1,474,500 | Wingqvist | Nov. 20, 1923 |
| 1,669,919 | Trbojevich | May 15, 1928 |
| 1,680,258 | Schurr | Aug. 7, 1928 |
| 1,798,059 | Bilgram et al. | Mar. 24, 1931 |
| 1,833,993 | Hill | Dec. 1, 1931 |
| 1,966,530 | Symons | July 17, 1934 |
| 1,997,228 | Nichols | Apr. 9, 1935 |
| 2,116,290 | Spicer | May 3, 1938 |
| 2,231,117 | Greiner | Feb. 11, 1941 |

FOREIGN PATENTS

| Number | Country | Date |
|---|---|---|
| 216,671 | Germany | Nov. 30, 1909 |